United States Patent [19]

De Bisschop

[11] Patent Number: 4,479,786
[45] Date of Patent: Oct. 30, 1984

[54] SHAFT ASSEMBLY
[75] Inventor: James G. De Bisschop, Litchfield, Conn.
[73] Assignee: The Torrington Company, Torrington, Conn.
[21] Appl. No.: 473,038
[22] Filed: Mar. 7, 1983
[51] Int. Cl.³ .............................................. F16D 3/76
[52] U.S. Cl. ....................................... 464/89; 74/492
[58] Field of Search ................ 74/492; 464/75, 87, 464/89, 180, 182, 183

[56] References Cited
U.S. PATENT DOCUMENTS 3,146,612  9/1964  Lorenz .......................... 464/89 X
3,878,695  4/1975  Pitner ........................... 464/89
4,183,258  1/1980  Stephan ....................... 464/89 X FOREIGN PATENT DOCUMENTS
2391390  1/1979  France .......................... 464/89
1126071  9/1968  United Kingdom .......... 74/492
2057632  4/1981  United Kingdom .......... 464/89
2070737  9/1981  United Kingdom .......... 464/89

Primary Examiner—Stuart S. Levy
Assistant Examiner—Daniel P. Stodola
Attorney, Agent, or Firm—F. S. Troidl

[57] ABSTRACT

The rotatable shaft assembly includes an elastomeric bushing which is provided in the space between an outer rotatable driven member and an inner rotatable driving member. The bushing transmits the rotation of the driving member to the driven member. Should the elastomeric bushing material fail or be subjected to excessive torque or axial force, a fail-safe washer transmits the rotation of the driving member to the driven member, and a retention washer prevents the axial disengagement of the driving member from the driven member.

4 Claims, 3 Drawing Figures

SHAFT ASSEMBLY

This invention relates to rotatable shaft assemblies. More particularly, this invention is a new rotatable shaft assembly such as those used in collapsible steering systems in vehicles.

In some types of rotatable shaft assemblies, such as at a U-Joint connection forming part of a vehicle steering assembly, an elastomeric bushing interconnects the steering shaft and a U-Joint. Often the elastomeric bushing is the only thing interconnecting the steering shaft and the U-Joint. There are no metal mechanical interconnections. Thus, noise due to frictional contact between two rotating mechanical parts is not a problem. However, if the elastomeric bushing deteriorates, fails, or is subjected to excessive torque and, therefore, no longer forms a strong connection between the steering shaft and the driven member, the steering shaft rotation and the driven member rotation will no longer be synchronized. The resulting noise soon becomes very disconcerting for the driver because everytime he turns the steering wheel, the steering shaft starts rotating with respect to the driven member and there is a time delay before the driven member begins to rotate.

Clearly a rotatable shaft assembly, particularly one used in a vehicle steering assembly, must include a fail-safe system which prevents excessive rotation of the steering shaft with respect to the driven member and also prevents the driving member from being moved axially out of the driven member resulting in loss of steering. This invention provides such a rotatable shaft assembly.

Previous rotatable steering shaft assemblies including an elastomeric bushing have involved piercing or drilling large holes through the bushing housing and then forming and/or inserting mechanical devices to prevent excessive rotation of the steering shaft with respect to the driven member and to prevent complete disengagement of the steering shaft from the driven member should the bushing material fail. Previous systems are more difficult to make and more expensive compared to this invention. Other similar previous rotatable steering shaft assemblies including an elastomeric bushing are illustrated by the collapsible shaft assembly shown in U.S. Pat. No. 4,183,258 issued Jan. 15, 1982 to Gerard Stephan.

This invention is a new and improved rotatable shaft assembly which is constructed so that in the event of the deterioration of the elastomeric bushing and/or a collision of the vehicle, the steering shaft will be limited in the amount of rotation it will make with respect to the driven member and the steering shaft cannot be disengaged or pulled out from the driven member.

Briefly described this invention comprises an elastomeric bushing mounted in the space between a driving member and a driven member so that rotation of the steering shaft imparts synchronous rotation of the driven member. A fail-safe washer is connected to the driven member. The washer has a central opening through which the driving member extends. The central opening is non-circular and is dimensioned so that the entire surface forming the central opening is normally spaced from the driving member which is also non-circular in cross section, at least in the area where the driving member extends through the opening. However, in the event of a deterioration of the bushing when the driving member is rotated, at least a portion of the surface of the driving member will come into contact with the central opening surface in the fail-safe washer to rotate the driven member.

To prevent the driving member from coming completely disengaged from the driven member, a retention washer is connected to the driving member. The driving member is provided with a portion of larger diameter. The larger diameter portion is located further away from the driver than the retention washer. If an accident occurs or for some other reason the driving member should make a sudden strong axial movement toward the driver, the larger diameter portion of the driving member will engage the retention washer so that the driving member is prevented from becoming disengaged and resulting in loss of steering.

The invention as well as its many advantages may be further understood by reference to the following detailed description and drawings in which.

In the various figures, like parts are referred to by like numbers.

Figure 1:
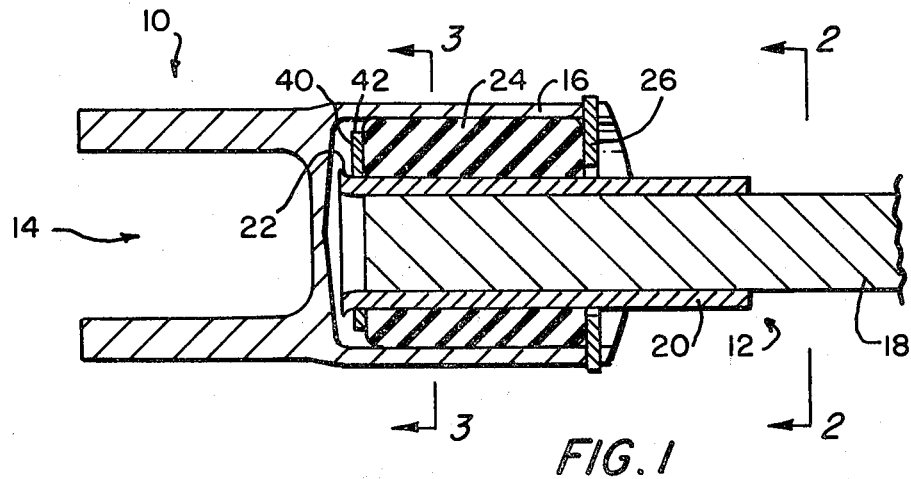
FIG. 1 is a side sectional view of the shaft assembly.

Referring to the drawings and more particularly to FIG. 1, a rotatable shaft assembly is shown which may, for example form a part of a collapsible shaft steering assembly. The shaft assembly includes a rotatable driven member 10 and a rotatable driving member 12. The driven member 10 consists of a yoke 14 with an integral drawn or extruded cup 16. The driving member 12 includes a steering shaft 18 upon which is mounted a sleeve 20 having a flared lower end 22.

An elastomeric bushing 24 is located in the annular space between the cup 16 and the sleeve 20. The elastomeric bushing normally has a cross section greater in its free state than the section of the annulus between the cup 16 and the sleeve 20 so that the elastomeric bushing 24 is radially compressed between the cup and the sleeve which renders the rotatable members and the elastomeric bushing rotationally fast so that normally the driven member 10 rotates at the same speed as the steering shaft 18.

The connection between the elastomeric bushing 24 and the sleeve 20 and/or the cup 16 can be reinforced by bonding or vulcanizing the bushing to the sleeve and/or the cup. The cup 16 surrounds and contains the elastomeric bushing 24.

Figure 2:
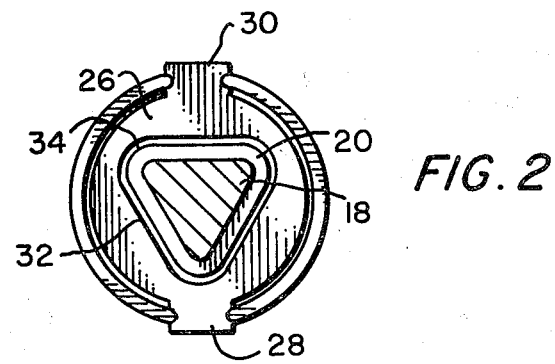
FIG. 2 is a view taken along lines 2—2 of FIG. 1 and in the direction of the arrows.
Figure 3:
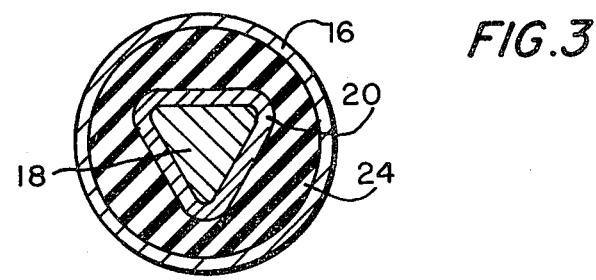
FIG. 3 is a view taken along lines 3—3 of FIG. 1 and in the direction of the arrows.

As shown in FIG. 2 and FIG. 3 the shaft 18, sleeve 20, and the central opening in the bushing 24 are all triangularly shaped with rounded corners in cross-section.

A fail-safe washer 26 is connected to the cup 16 and abuts against the upper axial end of the elastomeric bushing 24. The fail-safe washer 26 has a pair of diametrically opposed radially outwardly extending lugs 28 and 30 (see FIG. 2) which locate within diametrically opposed axial slots in the cup 16. The lugs 28 and 30 fit tightly and rigidly in the cup 16 so that when the fail-safe washer 26 is rotated, the cup 16 will rotate at the same speed as the fail-safe washer 26.

The central opening 32 of the fail-safe washer 26 is triangular shaped with rounded corners. The dimensions of the central opening 32 in the fail-safe washer 26 are such that normally a clearance 34 exists around the entire surface of the sleeve 20. The clearance 34 is provided because it is desired that normally the rotational connection between the sleeve 20 and the cup 16 be through the bushing 24. This eliminates a possible path for transmission of any vibrations between the sleeve and the cup, causing noise.

By using a non-circular cross section sleeve 20, at least in that part of the sleeve which extends through the fail-safe washer 26 and a coaxial non-circular central opening in the fail-safe washer 26, it can be seen by reference to FIG. 2 that in the event of a deterioration or other failure of the elastomeric bushing 24 at least a portion of the surface of the sleeve 20 will contact a portion of the surface forming the central opening 32 in the fail-safe washer 26, thereby limiting the relative rotation of the steering shaft 18 with respect to the driven member 10 in the event of a failure. If such failure occurs the vehicle operator will still be able to operate the vehicle (if the vehicle is otherwise operable) because steering shaft rotation will be transmitted to the driven member 10 through the washer 26. However, because of the metal to metal contact, it will be noisy and the operator will know to have the steering mechanism repaired.

This invention also includes a mechanism for preventing the driving member 12 from becoming disconnected from the cup 16 in the event of an accident. This mechanism includes a retention washer 40 abutting the lower axial end of the elastomeric bushing 24. The periphery 42 of the retention washer 40 is radially inwardly spaced from the cup 16 to make certain that under normal conditions the only rotational connection between the sleeve 20 and the cup 16 is through the elastomeric bushing 24. The flared portion 22 on the sleeve 20 is shaped so that in the event of a collision, any excessive movement of the steering shaft 18 in the direction of the driver will be limited by contact of the portion 22 against the retention washer 40.

In operation, under normal conditions of driving, the rotation of the steering shaft 18 will cause an equal rotation of the driven member 10 through the elastomeric bushing 24. If the elastomeric bushing 24 should deteriorate to the point where the steering shaft 18 rotates without an immediate driven member 10 response, or at high torsional loads a portion of the outer surface of the sleeve 20 will contact a portion of the surface of the fail-safe washer forming the central opening 32. Operation of the driven member 10 is then through the fail-safe washer until the steering assembly is repaired.

If desired the steering shaft 18 and sleeve 20 may be made in one piece. Also, though the longitudinal portion of the driving member 12 must be non-circular adjacent the non-circular central opening of the fail-safe washer 26, if desired, the remaining length of the driving member 12 may be circular in cross section. If that portion of the driving member extending through the central opening of the elastomeric washer 24 is circular, the central opening in the elastomeric bushing 24 should also be circular. Where cross sections and coaxial openings shown are triangular with rounded corners, other non-circular shapes may be used instead of the triangular shape.

I claim:

1. A rotatable shaft assembly for a vehicle comprising: a lower outer rotatable driven member; and upper inner rotatable driving member spaced from the driven member and having a non-circular periphery; an elastomeric bushing located in the space between the driving and driven rotatable members for rotating the driven member in response to driving member rotation; a fail-safe washer connected to the driven member, the washer having a central opening through which the driving member extends, the central opening being dimensioned so that the surface forming the central opening is normally spaced from the driving member, but in the event of elastomeric bushing failure or high torsional load at least a portion of said surface is contacted by the driving member to rotate the driven member; and a retention washer mounted on the driving member and abutting a lower axial end of the elastomeric bushing, the periphery of the retention washer being radially inwardly spaced from the driven member, the driving member having a protruding portion axially located and shaped to engage a lower axial end of the retention washer upon upward axial movement of the driving member to prevent further axial movement of the driving member, whereby in the event of a collision of the vehicle, upward axial movement of the driving member is limited by contact of said driving member portion against the retention washer.

2. A rotatable shaft assembly in accordance with claim 1 wherein: the driving member is triangular with rounded corners in cross-section and the opening in the fail-safe washer is also triangular with rounded corners.

3. A rotatable shaft assembly in accordance with claim 2 wherein: the fail-safe washer abuts against the upper axial end of the elastomeric bushing.

4. A rotatable shaft assembly in accordance with claim 1 wherein said driving member protruding portion which engages the retention washer upon axial movement of said driving member portion is flared.

* * * * *